(12) United States Patent
Chen et al.

(10) Patent No.: US 11,637,776 B2
(45) Date of Patent: Apr. 25, 2023

(54) NETWORK DEVICE AND PACKET REPLICATION METHOD

(71) Applicant: Cortina Access, Inc., San Jose, CA (US)

(72) Inventors: Charles Chen, San Jose, CA (US); Donggun Keung, San Jose, CA (US)

(73) Assignee: REALTEK SINGAPORE PTE LTD., Singapore (SG)

( * ) Notice: Subject to any disclaimer, the term of this patent is extended or adjusted under 35 U.S.C. 154(b) by 0 days.

(21) Appl. No.: 17/302,195

(22) Filed: Apr. 27, 2021

(65) Prior Publication Data

US 2022/0345403 A1    Oct. 27, 2022

(51) Int. Cl.
*G06F 15/16* (2006.01)
*H04L 45/74* (2022.01)
(Continued)

(52) U.S. Cl.
CPC .............. *H04L 45/74* (2013.01); *H04L 45/02* (2013.01); *H04L 45/566* (2013.01); *H04L 45/66* (2013.01)

(58) Field of Classification Search
CPC ....... H04L 45/74; H04L 45/02; H04L 45/566; H04L 45/66; H04L 9/40; H04L 67/1021; H04L 67/10015; H04L 67/1001
(Continued)

(56) References Cited

U.S. PATENT DOCUMENTS 7,869,425 B2    1/2011 Elliott et al.
8,510,821 B1    8/2013 Brandwine et al.
(Continued)

FOREIGN PATENT DOCUMENTS

WO    WO-2007072248 A2 *  6/2007  .......... H04N 21/4325
WO    WO-2018082787 A1 *  5/2018  ............... H04L 1/08

OTHER PUBLICATIONS

A Service Protection Mechanism Impelemented on P4 by Packet Replication Guopeng Zhang;Shuai Gao;Jiarui Yue;Zixuan Zhao 2021 2nd Information Communication Technologies Conference (ICTC) Year: 2021 | Conference Paper | Publisher: IEEE (Year: 2021).*

(Continued)

*Primary Examiner* — Oscar A Louie
*Assistant Examiner* — Oluwatosin M Gidado
(74) *Attorney, Agent, or Firm* — McClure, Qualey & Rodack, LLP

(57) ABSTRACT

A network device and a packet replication method are provided. The network device includes a classification engine, a forwarding engine, and a packet replication device. The packet replication device includes an interface circuit, a replication control circuit, and a storage unit. The interface circuit retrieves a packet of a flow from the forwarding engine and correspondingly outputs a replicated packet to the replication control circuit. The replication control circuit calculates a current rate corresponding to the replicated packet, checks a flow table for a cumulative number of replicated packets of the flow, and determines, according to the current rate and the cumulative number of replicated packets, to forward the replicated packet. The storage unit stores the flow table. The replication control circuit transmits the replicated packet to at least one application engine through at least one communication port for security inspection.

17 Claims, 5 Drawing Sheets

(51) Int. Cl.
*H04L 45/00* (2022.01)
*H04L 45/02* (2022.01)

(58) Field of Classification Search
USPC .......................................................... 709/238
See application file for complete search history.

(56) References Cited

U.S. PATENT DOCUMENTS

| | | | | |
|---|---|---|---|---|
| 2003/0026268 | A1* | 2/2003 | Navas | H04L 45/26 370/389 |
| 2003/0154427 | A1* | 8/2003 | Hermann | H04L 12/66 714/31 |
| 2007/0177525 | A1* | 8/2007 | Wijnands | H04L 47/125 370/254 |
| 2012/0047328 | A1* | 2/2012 | Williams | G11B 5/09 711/E12.017 |
| 2015/0036498 | A1* | 2/2015 | Ehara | H04L 47/28 370/235 |
| 2015/0043330 | A1* | 2/2015 | Hu | H04L 49/557 370/225 |
| 2015/0222526 | A1* | 8/2015 | Baykal | H04L 45/308 370/352 |
| 2016/0308696 | A1* | 10/2016 | Nishimura | H04L 45/38 |
| 2016/0342618 | A1* | 11/2016 | Watkins | G06F 16/1748 |
| 2017/0147671 | A1* | 5/2017 | Bensberg | G06F 16/24552 |
| 2018/0167307 | A1* | 6/2018 | Barry | H04L 45/18 |
| 2019/0356589 | A1* | 11/2019 | Louzoun | H04L 45/74 |
| 2020/0045149 | A1* | 2/2020 | Maeda | H04L 12/4633 |
| 2020/0267118 | A1* | 8/2020 | Gao | H04L 69/167 |
| 2020/0412563 | A1* | 12/2020 | Jereczek | H04L 12/4633 |

OTHER PUBLICATIONS

Centralized versus distributed replication model for multicast replication Zlatan Begic;Melika Bolic;Himzo Bajric ELMAR 2007 Year: 2007 | Conference Paper | Publisher: IEEE (Year: 2017).*

Intrusion detection and defense mechanism for packet replication attack over MANET using swarm intelligence G. Indirani; K. Selvakumar; V. Sivaaamasundari 2013 International Conference on Pattern Recognition, Informatics and Mobile Engineering Year: 2013 | Conference Paper | Publisher: IEEE (Year: 2013).*

Requirements for deep packet inspection in next generation networks, ITU-T, Y.2770, Nov. 2012.

Framework for deep packet inspection, ITU-T, Y.2771, Jul. 2014.

Specification of the IP flow information export (IPFIX) protocol for the exchange of IP traffic flow information, B. Claise, IETF, RFC 5101, Jan. 2008.

Security architecture for the Internet Protocol, S. Kent, IETF, RFC 4301, Dec. 2005.

* cited by examiner

| Flow entry | Field 1 | Field 2 | ... | Field n | Cumulative number of replicated packets | Aging time |
|---|---|---|---|---|---|---|
| 1 | | | | | | |
| 2 | | | | | | |
| ... | | | | | | |
| m | | | | | | |

206

FIG. 4

NETWORK DEVICE AND PACKET REPLICATION METHOD

BACKGROUND

Technical Field

The present invention relates to a network device, and in particular, to a network device and a packet replication method for flow-based packet replication.

Related Art

With the proliferation of Internet, security of a residential network environment, a commercial network environment, an education network environment, and a research network environment increasingly becomes an important topic. There are emerging security applications such as threat detection, parental control, or deep packet inspection. Those applications require the inspection of user data traffic flows in order to detect security related issues.

A residential network is exemplified. As shown in FIG. 1, in a typical residential gateway 30, access from a home network to the Internet is provided. A packet enters through an ingress port 32, and a classification engine 34 identifies the packets and transmits the to-be-transmitted packets to a forwarding engine 36, so that the forwarding engine 36 outputs a corresponding packet through a corresponding egress port 38 according to an IP address. However, in a traditional residential gateway 30, the packets are not inspected as a security application, which cannot meet current requirements on network security.

SUMMARY

The present invention provides a network device, including a classification engine, a forwarding engine, and a packet replication device. The classification engine is coupled to the forwarding engine, and the packet replication device is coupled to the forwarding engine. The classification engine is configured to identify a plurality of packets in a flow and transmit the packets to the forwarding engine, and the forwarding engine is configured to forward the packets to the corresponding egress ports. The packet replication device includes an interface circuit, a replication control circuit, and a storage unit. The interface circuit is coupled to the forwarding engine to retrieve at least one of the packets from the forwarding engine and correspondingly output a replicated packet. The replication control circuit is coupled to the interface circuit to receive the replicated packet. The replication control circuit is configured to calculate a current rate corresponding to the replicated packet, check a flow table for a cumulative number of replicated packets of the flow, and determine, according to the current rate and the cumulative number of replicated packets, to forward the replicated packet to at least one application engine through at least one communication port. The storage unit is configured to store the flow table.

The present invention further provides a packet replication method, including: retrieving a packet of a flow from a forwarding engine and correspondingly outputting a replicated packet; calculating a current rate corresponding to the replicated packet; checking a flow table for a cumulative number of replicated packets of the flow; and determining, according to the current rate and the cumulative number of replicated packets, to forward the replicated packet to an application engine.

Based on the above, in the present invention, an independent flow-based packet replication device is used to enhance the network device, so as to avoid interfering with or affecting the packet forwarding function of the forwarding engine and provide more application functions. For example, in the present invention, packet inspection is provided for security applications, and the packet replication device does not interfere with or affect the normal packet forwarding function of the forwarding engine, which improves network security while allowing client data traffic to operate normally.

The purposes, the technical content, and the effects achieved in the present invention are easier to understand by means of specific embodiments, accompanying drawings, and detailed description.

BRIEF DESCRIPTION OF THE DRAWINGS

FIG. 4 is a schematic diagram of a flow table according to an embodiment of the present invention.

DETAILED DESCRIPTION

Figure 1:
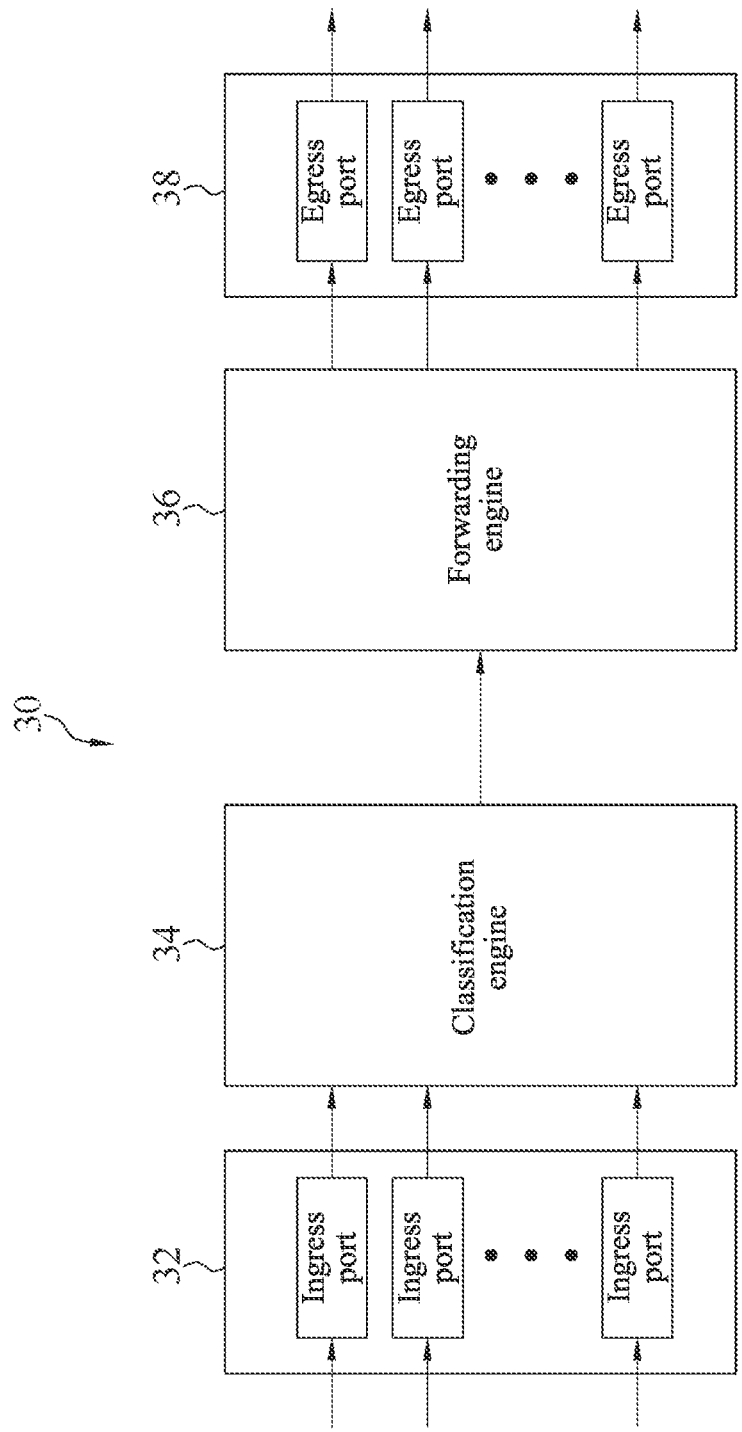
FIG. 1 is a schematic block diagram of a conventional residential gateway.

Embodiments of the present invention are described below with reference to related drawings. In the drawings, the same reference numerals indicate the same or similar elements or circuits.

It should be understood that words "include" and "comprise" used in this specification are used to indicate existence of specific technical features, values, method steps, operations and processing, and/or elements, but do not exclude more technical features, values, method steps, operations and processing, elements, or any combination of the above.

Figure 2:
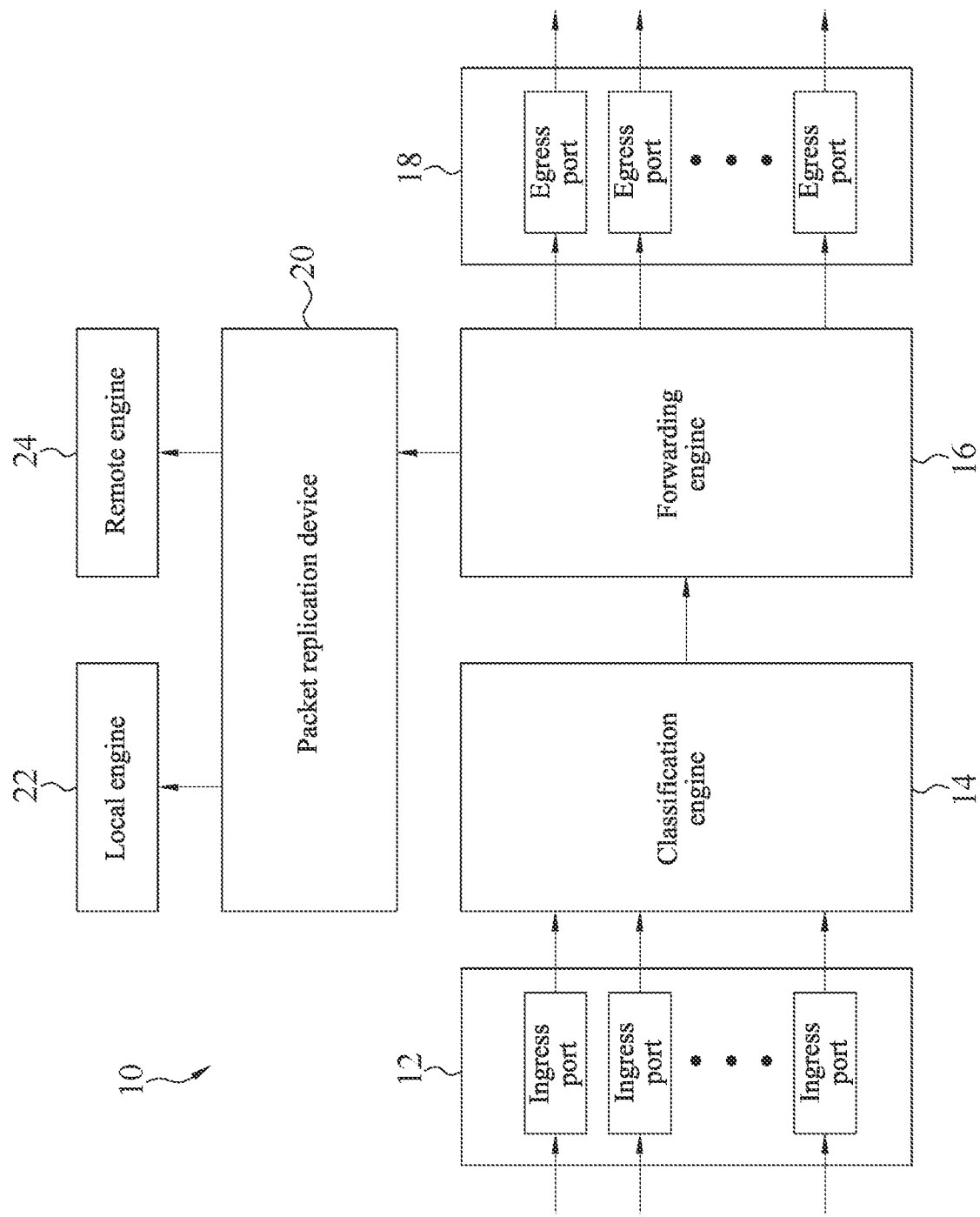
FIG. 2 is a schematic block diagram of a network device according to an embodiment of the present invention.

FIG. 2 is a schematic block diagram of a network device according to an embodiment of the present invention. Referring to FIG. 2, a network device 10 includes a plurality of ingress ports 12, a classification engine 14, a forwarding engine 16, a plurality of egress ports 18, and a packet replication device 20. The ingress ports 12 are connected to the classification engine 14, the classification engine 14 is connected to the forwarding engine 16, and the forwarding engine 16 is connected to the egress ports 18 and the packet replication device 20. Flows (packet flows) enter the classification engine 14 through the ingress ports 12. The classification engine 14 identifies a flow that can be used for traffic control actions and security policy actions. The flow is identified by using a packet header and/or packet payload, and a plurality of packets in the same flow have the same source IP address, destination IP address, source port number, and destination port number for identifying the packet. The traffic control actions include rate limiting, priority setting, or packet editing, and the security policy actions include dropping or redirection of the packet. Therefore, the classification engine 14 is disposed prior to the forwarding engine 16, so that the packets to be dropped or discarded no longer need to be forwarded.

Upon receipt of the packet, the forwarding engine 16 determines, by checking packet parameters such as the destination IP address, a corresponding egress port 18 to which the packet is to be forwarded. In addition, the packet replication device 20 replicates the packet and provides the replicated packet to at least one security engine based on each flow. For example, the replicated packet is provided to a local engine 22 disposed on an apparatus. For example, security-related applications may be executed by a central processing unit (CPU). For another example, the replicated packet is provided to a remote engine 24 located on the Internet, but the present invention is not limited thereto. In an embodiment, the apparatus may perform security inspection by using the local engine 22 and the remote engine 24. In an embodiment, the local engine 22 and the remote engine 24 may be one or more security-related applications, such as threat detection, parental control, deep packet inspection, or the like.

Figure 3:
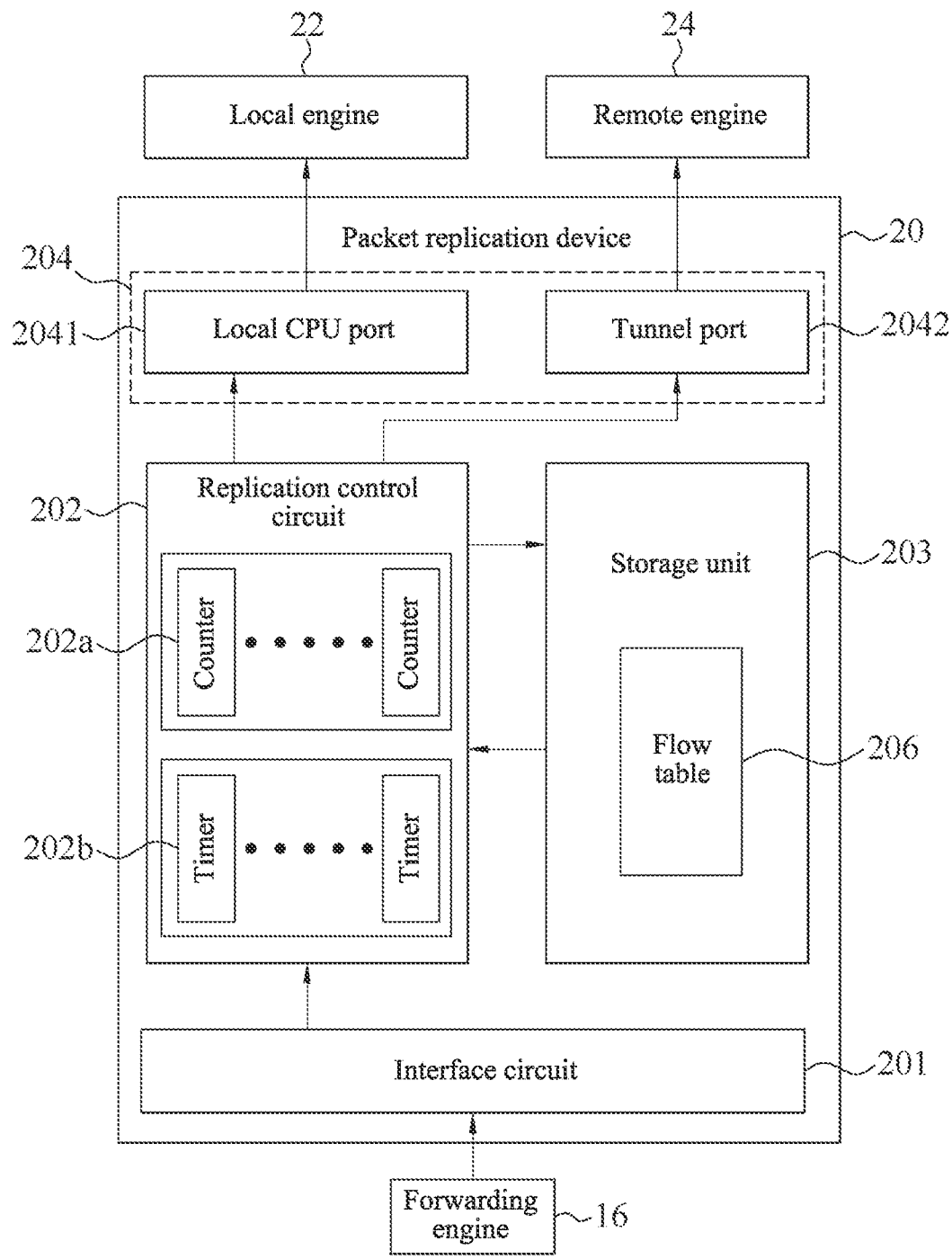
FIG. 3 is a schematic block diagram of a packet replication device according to an embodiment of the present invention.
Figure 5:
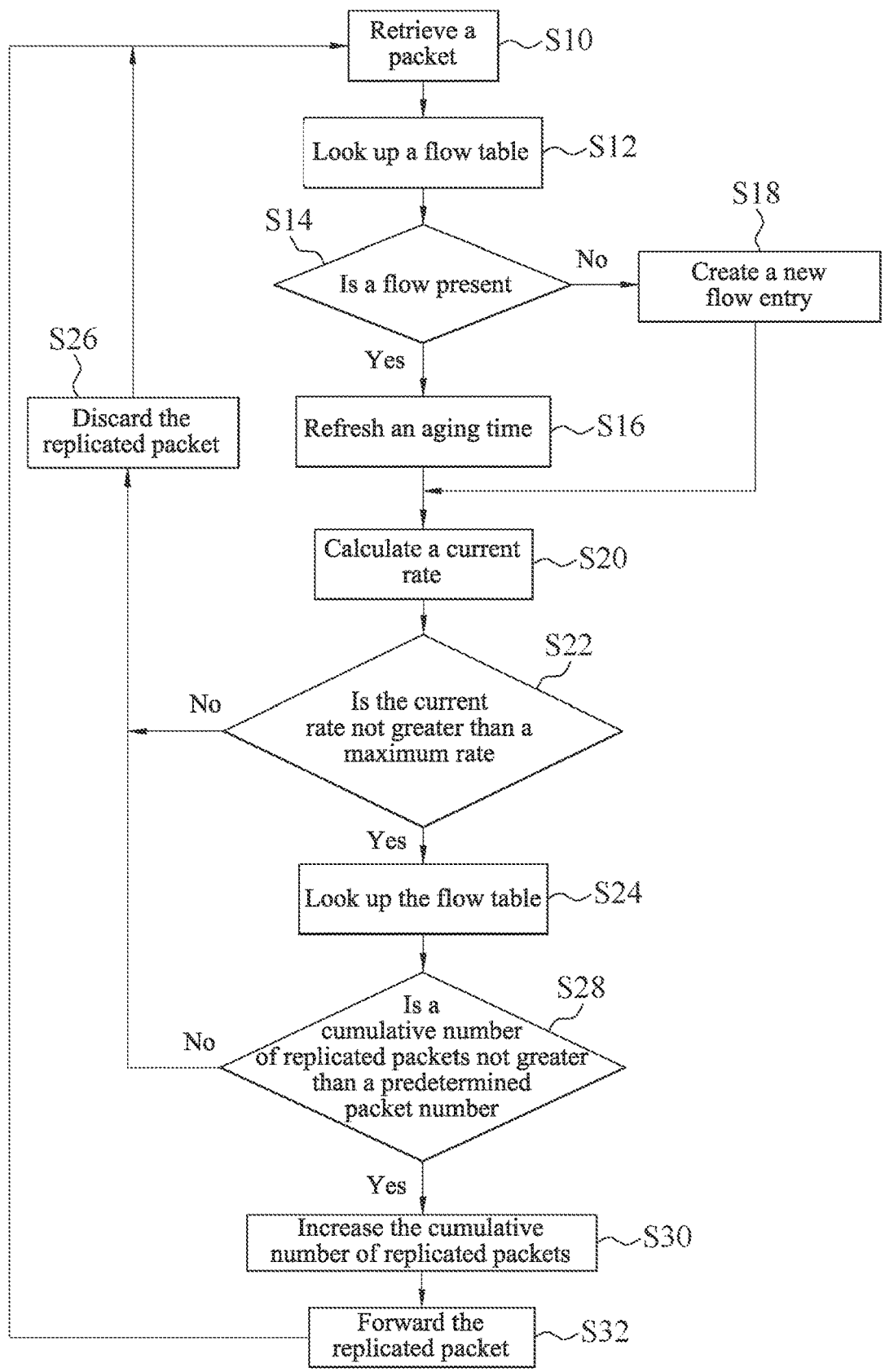
FIG. 5 is a schematic flowchart of a packet replication method according to an embodiment of the present invention.

FIG. 3 is a schematic block diagram of a packet replication device according to an embodiment of the present invention. Referring to FIG. 2 and FIG. 3 together, the packet replication device 20 includes an interface circuit 201, a replication control circuit 202, a storage unit 203, and at least one communication port 204. Corresponding to the local engine 22 and the remote engine 24, the at least one communication port 204 includes a local CPU port 2041 and a tunnel port 2042. The replication control circuit 202 is connected to the forwarding engine 16 through the interface circuit 201, and the replication control circuit 202 is electrically connected to the storage unit 203 and the at least one communication port 204. The replication control circuit 202 is signally connected to the local engine 22 through the local CPU port 2041 and is signally connected to the remote engine 24 through the tunnel port 2042. In an embodiment, the forwarding engine 16 utilities a read pointer to a packet to be forwarded. The interface circuit 201 also uses the read pointer to retrieve the packet from the forwarding engine 16 and outputs a replicated packet to the replication control circuit 202. The replication control circuit 202 is a central control logic of the entire packet replication device 20, which is configured to manage a flow table 206 for flow management, and determine, according to a maximum rate, whether the replicated packet is to be outputted to the local engine 22 or the remote engine 24 through the local CPU port 204 or the tunnel port 205. The storage unit 203 is configured to store the flow table 206. In detail, the replication control circuit 202 receives the replicated packet through the interface circuit 201, and the replication control circuit 202 calculates a current rate corresponding to the replicated packet according to a length and a progression time of the packet, further looks up the flow table 206 stored in the storage unit 203 when determining that the current rate is not greater than (less than or equal to) the maximum rate, and determines whether a cumulative number of replicated packets of the flow recorded in the flow table 206 is not greater than (less than or equal to) a predetermined packet number. When the cumulative number of replicated packets is not greater than the predetermined packet number, the replication control circuit 202 increases the cumulative number of replicated packets and transmits the replicated packet to the local engine 22 through the local CPU port 2041 or transmits the replicated packet to the remote engine 24 through the tunnel port 2042. In addition, the replication control circuit 202 discards the replicated packet when the current rate is greater than the maximum rate or when the cumulative number of replicated packets is greater than the predetermined packet number.

In an embodiment, the predetermined packet number is a first plurality of packets in the corresponding flow.

In an embodiment, the interface circuit 201 is a dual-ported random-access memory (DPRAM) interface.

For the flow table 206, refer to FIG. 4. The flow table 206 includes m flow entries, and each of the flow entries has a plurality of packet parameters from field 1 to field n to define a corresponding flow. In an embodiment, when the plurality of packet parameters constitute 5-tuple, n is equal to 5. Each of the flow entries includes packet parameters such as a source IP address, a destination IP address, a source port number, a destination port number, a transport layer protocol, and the like. Referring to FIG. 3 and FIG. 4, the replication control circuit 202 further includes a plurality of counters 202a and a plurality of timers 202b. Each of the flow entries corresponds to one of the counters 202a and one of the timers 202b. Each of the counters 202a counts a number of replicated packets in each flow that are forwarded by the replication control circuit 202 and records the obtained cumulative number of replicated packets in the flow table 206. Each of the timers 202b calculates an aging time of each of the flow entries and records the aging time in the flow table 206. Therefore, in addition to recording the packet parameters such as the source IP address, the destination IP address, the source port number, the destination port number, and the transport layer protocol, each of the flow entries further includes the cumulative number of replicated packets and the aging time of each of the flows.

Referring to FIG. 3 and FIG. 4, upon receipt of the replicated packet, the replication control circuit 202 may further determine whether a flow to which the replicated packet belongs is present in the m flow entries in the flow table 206. If so, it means that the flow to which the replicated packet belongs is indeed present in the flow entries in the flow table 206, and the replication control circuit 202 refreshes the aging time in the flow entry corresponding to the flow to indicate consecutive activities of the flow. If not, it means that the flow to which the replicated packet belongs is not present in the flow entries in the flow table 206, and the replication control circuit 202 creates a new flow entry in the flow table 206 to record packet parameters, a cumulative number of replicated packets, and an aging time corresponding to the flow. In addition, even if the cumulative number of replicated packets is greater than the predetermined packet number, the flow entry does not necessarily age out. However, when the aging time in one of the flow entries exceeds a predetermined expiration time, the replication control circuit 202 deletes the flow entry from the flow table 206.

Based on the above, the above maximum rate of outputting the replicated packet to the local engine 22 or the remote engine 24, the predetermined packet number, and the predetermined expiration time are configurable parameters, which may be adjusted according to an actual usage environment and an actual usage condition. Moreover, a user may further choose to enable the replication control device 20 or disable the replication control device 20 according to requirements.

As shown in FIG. 3, the local engine 22 is located inside an apparatus of the network device 10 and usually runs on a CPU of the apparatus. Therefore, the replicated packet is transmitted to the local engine 22 through the local CPU port 2041. In addition, since the remote engine 24 is located at a remote position of the Internet, a mechanism such as a tunneling protocol is required to transmit the replicated packet to the remote engine 24 through the tunnel port 2042.

The tunneling protocol is a communication protocol. For example, a standards-based IPsec tunnel may be used.

Based on the above network device 10, the present invention further provides a packet replication method applicable to the network device 10. Steps of the packet replication method are described in detail as follows.

Referring to FIG. 2 to FIG. 5, a plurality of packets of a flow enter through the ingress ports 12, and are identified and classified by the classification engine 14 and then transmitted to the forwarding engine 16 for forwarding. In this case, as shown in step S10, the replication control circuit 202 in the packet replication device 20 receives, through the interface circuit 201, a replicated packet generated by retrieving a packet of the flow from the forwarding engine 16. As shown in step S12, the replication control circuit 202 looks up the flow table 206 stored in the storage unit 203 according to the replicated packet, and then as shown in step S14, the replication control circuit 202 may determine whether a flow to which the replicated packet belongs is present in a plurality of flow entries in the flow table 206. If the flow to which the replicated packet belongs is indeed present in the flow entries in the flow table 206, step S16 is performed. The replication control circuit 202 refreshes an aging time in a flow entry corresponding to the flow, so as to recalculate the aging time of the flow by using the timer 202a. If the flow to which the replicated packet belongs is not present in the flow entries in the flow table 206, step S18 is performed. As shown in step S18, the replication control circuit 202 creates a new flow entry in the flow table 206, calculates a cumulative number of replicated packets and an aging time of the flow through the counter 202a and the timer 202b, respectively, and records the obtained cumulative number of replicated packets and the aging time in the flow table 206.

Then, as shown in step S20 and step S22, the replication control circuit 202 calculates a current rate corresponding to the replicated packet, and determines whether the current rate is not greater than a maximum rate. When the current rate is not greater than the maximum rate, as shown in step S24, the replication control circuit 202 looks up the flow table 206. When it is determined that the current rate is greater than the maximum rate, as shown in step S26, the replication control circuit 202 discards the replicated packet. After the step of looking up the flow table 206 shown in step S24 is completed, as shown in step S28, the replication control circuit 202 determines whether the cumulative number of replicated packets of the flow recorded in the flow table 206 is not greater than a predetermined packet number. When the cumulative number of replicated packets is not greater than the predetermined packet number, as shown in step S30 and step S32, the counter 202a increases the cumulative number of replicated packets and stores the cumulative number of replicated packets in the flow table 206, and then the replication control circuit 202 forwards the replicated packet to the corresponding local engine 22 or remote engine 24 through the local CPU port 2041 or the tunnel port 2042. If the replication control circuit 202 determines that the cumulative number of replicated packets is greater than the predetermined packet number in step S28, as shown in step S26, the replication control circuit 202 directly discards the replicated packet. All replicated packets obtained by the packet replication device 20 by replicating packets read from the forwarding engine 16 may be forwarded to the local engine 22 or the remote engine 24 through the above process for security inspection of the packets.

Furthermore, referring to FIG. 2, once the local engine 22 or the remote engine 24 detects a security threat or alert to the packet in the flow, it can utilize the classification engine 14 to block the flow. The function may be referred to as blacklisting or an access control list (ACL). In addition, the classification engine 14 may further use a whitelisting. The whitelisting may explicitly allow specific packets to pass through without blocking or denial. The local engine 22 or the remote engine 24 may use the whitelisting to allow some flow packets to directly pass through without being replicated. In order to support the whitelisting function, the network device 10 needs to notify the packet replication device 20 through the classification engine 14, so that the packet replication device 20 allows flow packets in the whitelisting to be accessed without being replicated on the flow. This part may be achieved by defining a control bit of a packet header in packet parameters of a received packet. The packet header is used to transfer packet control information from one engine to another engine in the apparatus. The control bit of the packet header indicates, to the packet replication device 20, whether the packet needs to be replicated.

In an embodiment, an architecture of the present invention may also be easily applicable to other applications. In other words, when the local engine 22 and/or the remote engine 24 can perform other related applications, the architecture of the present invention may also be easily applicable to other applications.

Based on the above, in the present invention, an independent flow-based packet replication device is used to enhance the network device, the packet replication device can identify dynamic flow packets and replicate the packets to the security engine, to provide packet inspection for security applications. In addition, the packet replication device does not interfere with or affect the normal packet forwarding function of the forwarding engine, which improves network security while allowing client data traffic to operate normally.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A network device, comprising:
   a classification engine configured to classify a plurality of packets of a flow;
   a forwarding engine coupled to the classification engine and configured to forward the packets through corresponding egress ports according to corresponding destination of the packets; and
   a packet replication device coupled to the forwarding engine and comprising:
   an interface circuit coupled to the forwarding engine to retrieve at least one of the packets from the forwarding engine and correspondingly output a replicated packet through at least one of a local CPU port and a tunnel port;
   a replication control circuit coupled to the interface circuit to receive the replicated packet, wherein the replication control circuit calculates a current rate corresponding to the replicated packet, check a flow table for a cumulative number of replicated packets of the flow, and determines, according to the current rate and the cumulative number of replicated packets, to selectively forward the replicated packet to at least one security engine through at least one of the local CPU port and the tunnel port based on the execution of one or more security-related applications, wherein the replicated packet is selectively forwarded in response to the cumulative number of replicated packets recorded in the flow table not being greater than a predetermined packet number, wherein the replicated packet is discarded in response to the cumulative number of replicated packets recorded in the flow table being greater than the predetermined packet number; and a storage unit configured to store the flow table.

2. The network device according to claim 1, wherein the replication control circuit is configured to determine whether the flow to which the replicated packet belongs is present in a plurality of flow entries in the flow table upon receipt of the replicated packet, and if so, refresh an aging time in the flow entry corresponding to the flow, and if not, create a new flow entry in the flow table.

3. The network device according to claim 2, wherein the replication control circuit further comprises a plurality of counters and a plurality of timers, each of the flow entries corresponds to one of the counters and one of the timers, each of the counters is configured to count a number of replicated packets in the flow that are forwarded by the replication control circuit and records the obtained cumulative number of replicated packets in the flow table, and each of the timers is configured to calculate the aging time of the flow entry and records the aging time in the flow table.

4. The network device according to claim 3, wherein when the aging time exceeds a predetermined expiration time, the replication control circuit deletes the flow entry from the flow table.

5. The network device according to claim 1, wherein the replication control circuit discards the replicated packet when the current rate is greater than a maximum rate.

6. The network device according to claim 1, wherein the predetermined packet number is a first plurality of packets in the corresponding flow.

7. The network device according to claim 2, wherein in addition to recording the cumulative number of replicated packets and the aging time, each of the flow entries in the flow table further comprises packet parameters including a source IP address, a destination IP address, a source port number, a destination port number, and a transport layer protocol to determine, according to the packet parameters, whether the flow to which the replicated packet belongs is present in the flow table.

8. The network device according to claim 1, wherein the security-related application comprises at least one of threat detection, parental control and deep packet inspection.

9. The network device according to claim 1, wherein the interface circuit is a dual-ported random-access memory (DPRAM) interface.

10. A packet replication method, comprising:

retrieving a packet of a flow from a forwarding engine and correspondingly outputting a replicated packet through at least one of a local CPU port and a tunnel port;

calculating a current rate corresponding to the replicated packet;

checking a flow table for a cumulative number of replicated packets of the flow; and determining, according to the current rate and the cumulative number of replicated packets, to selectively forward the replicated packet to at least one security engine through at least one of the local CPU port and the tunnel port based on the execution of one or more security-related applications, wherein the replicated packet is selectively forwarded in response to the cumulative number of replicated packets recorded in the flow table not being greater than a predetermined packet number, wherein the replicated packet is discarded in response to the cumulative number of replicated packets recorded in the flow table being greater than the predetermined packet number.

11. The packet replication method according to claim 10, wherein after the step of receiving the replicated packet, the method further comprises determining whether the flow to which the replicated packet belongs is present in a plurality of flow entries in the flow table, and if so, refreshing an aging time in the flow entry corresponding to the flow, and if not, creating a new flow entry in the flow table.

12. The packet replication method according to claim 11, wherein each of the flow entries records the corresponding cumulative number of replicated packets and the aging time.

13. The packet replication method according to claim 12, wherein when the aging time exceeds a predetermined expiration time, the flow entry is deleted from the flow table.

14. The packet replication method according to claim 12, wherein in addition to recording the cumulative number of replicated packets and the aging time, each of the flow entries in the flow table further comprises packet parameters including a source IP address, a destination IP address, a source port number, a destination port number, and a transport layer protocol to determine, according to the packet parameters, whether the flow to which the replicated packet belongs is present in the flow table.

15. The packet replication method according to claim 10, wherein the replicated packet is discarded when it is determined that the current rate is greater than a maximum rate.

16. The packet replication method according to claim 10, wherein the predetermined packet number is a first plurality of packets in the corresponding flow.

17. The packet replication method according to claim 10, wherein the security-related application comprises at least one of threat detection, parental control and deep packet inspection.

* * * * *